No. 786,470. PATENTED APR. 4, 1905.
I. TENNANT.
PNEUMATIC TIRE.
APPLICATION FILED AUG. 6, 1904.
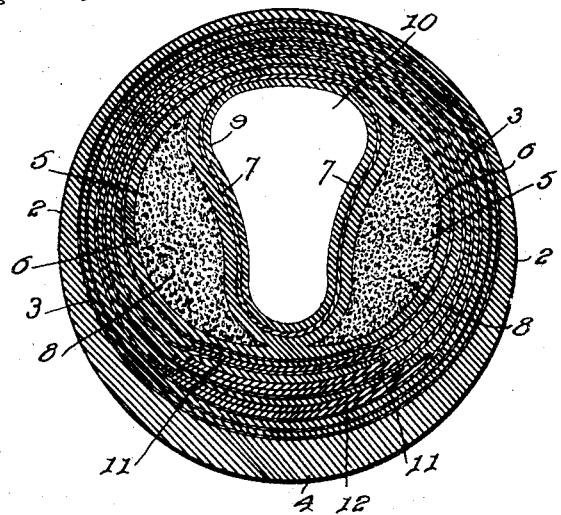
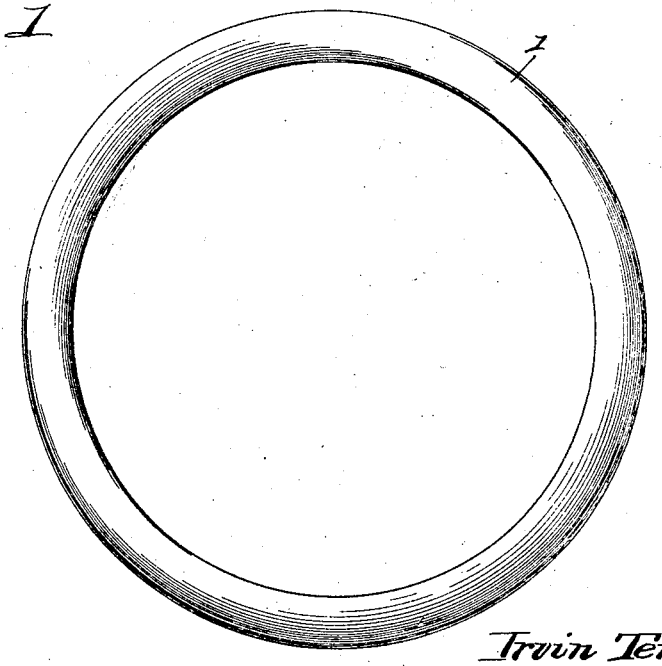
Witnesses
G. Howard Walmsley
Irvine Miller
Inventor
Irvin Tennant,
By W. A. Goulding.
Attorney No. 786,470.

Patented April 4, 1905.

UNITED STATES PATENT OFFICE.

IRVIN TENNANT, OF SPRINGFIELD, OHIO, ASSIGNOR TO TENNANT AUTO-TIRE COMPANY, OF SPRINGFIELD, OHIO, A CORPORATION OF NEW JERSEY.

PNEUMATIC TIRE.

SPECIFICATION forming part of Letters Patent No. 786,470, dated April 4, 1905.

Application filed August 6, 1904. Serial No. 219,713.

*To all whom it may concern:*

Be it known that I, IRVIN TENNANT, a citizen of the United States, residing at Springfield, in the county of Clark and State of Ohio, have invented certain new and useful Improvements in Pneumatic Tires, of which the following is a specification, reference being had therein to the accompanying drawings.

This invention relates to pneumatic tires, and is in the nature of an improvement upon the type of tire set forth in my prior Letters Patent, No. 709,280, granted to me September 16, 1902.

More specifically, the structure embodying my present invention is in the nature of an improvement upon my prior Letters Patent, No. 744,436, granted to me November 17, 1903, this latter patented structure being itself an improvement upon what is disclosed in my earlier patent.

The specific object of my present invention is to increase the resilience of the tire without diminishing its puncture-resisting qualities; and to this end my present invention consists in certain novel features, which I will now proceed to describe and will then particularly point out in the claims.

In the accompanying drawings, Figure 1 is an elevation of a tire embodying my invention in one form, and Fig. 2 is an enlarged transverse sectional view of the same.

In the accompanying drawings the tire is shown as composed of a tubular body 1, built up of an outer portion 2, of rubber, and an inner portion 3, of fabric, this latter being preferably composed of a plurality of layers which may be formed by winding the fabric around a suitable mandrel so that the various layers are continuous and spiral in cross-section. The tire is preferably thickest at the tread portion 4. Within the tire, at the sides thereof, are located protective chambers 5, one on each side of the tire and coextensive with the exposed portion of said side, said chambers being defined by the walls 6 and 7, the former being coincident with the inner wall of the body of the tire and the latter being inwardly arched, as shown. These chambers are provided with a protective filling 8, preferably of sponge-rubber or the like. These protective bodies are elongated in cross-section, with their longitudinal axes converging outwardly, as shown, their outer ends being closer together than their inner ends. 9 indicates the inner tube or air-chamber which lines the air-space 10 and makes the same air-tight.

In my prior Letters Patent, No. 744,436, I have described a tire constructed in the manner just described, having embodied in its tread portion a protective strip of material similar or analogous to the rubber of which the tire is composed, but of greater hardness, and united to the body in which it is embedded during the process of curing or vulcanizing the tire. In my said prior Letters Patent, however, this strip is a single layer or thickness and requires a relatively great thickness in order to render it capable of effectually resisting puncture. In practice I have found that by the employment of a plurality of such protective strips relatively thin and arranged concentrically a measure of protection against puncture may be obtained fully as great as, if not greater than, that obtained by my prior construction, while at the same time the resilience of the tire is materially increased, owing to the greater flexibility of the relatively thin strips over the thicker strip of the earlier construction. These relatively thin concentric protective strips are indicated by the reference-numeral 11, three of them being shown in the present instance and each being provided with a central strip of fabric 12, although this latter feature may be dispensed with. I prefer to arrange the protective strips 11 between the layers of fabric 3, as clearly shown in Fig. 2, it being understood that the fabric and the spaces between the layers thereof are fully impregnated with and permeated by the rubber, as is usual in structures of this class. During vulcanization the fabric, rubber, and protective strips become united into an integral body, and the protective strips are firmly held in proper position relatively to the body of the tire and properly spaced apart from each other by means of the layers of fabric.

It will be understood, of course, that the protective strip is of a width at least equal to the width of the exposed portion of the central air-chamber, said protective strip extending for that purpose over the outer extremities of the lateral chambers.

The tire thus constructed has all the advantages described in connection with the tires set forth in my prior Letters Patent and is at the same time more resilient and equally puncture-proof, if not more so.

I do not wish to be understood as limiting myself strictly to the precise details of construction hereinbefore described and shown in the accompanying drawings, as it is obvious that these details may be modified without departing from the principle of my invention.

Having thus fully described my invention, what I claim as new, and desire to secure by Letters Patent, is—

1. A pneumatic tire comprising a tubular body of rubber having a thickened tread portion and lateral protective chambers, one on each side of the tire and coextensive with the exposed portions of said sides, and a central chamber for compressed air, protective fillings of compressible material located in the lateral protective chambers, and a protective feature made of a material similar or analogous to the material of which the body of the tire is composed, located in the tread of the tire and having a width at least equal to the width of the exposed portion of the central air-chamber at said tread, said protective feature being composed of a plurality of relatively thin concentric annular sections, each flexible, but of greater hardness than the body of the tire, their thinness giving flexibility to the tire and their plurality providing protection thereto.

2. A pneumatic tire having a body composed of rubber and a plurality of layers of fabric, inclosing a central air-chamber, and lateral protective chambers which protect and sustain said walls, in combination with a protective feature made of a material similar or analogous to the rubber of the tire, said protective feature being composed of a plurality of concentric relatively thin annular sections located between and separated by the layers of fabric and of greater hardness than the body of the tire, the thinness of the strips giving flexibility to the tire, and their plurality providing protection thereto.

In testimony whereof I affix my signature in presence of two witnesses.

IRVIN TENNANT.

Witnesses:
 AL H. KUNKLE,
 IRVINE MILLER.